United States Patent [19]

Nakatsubo et al.

[11] 4,080,045
[45] Mar. 21, 1978

[54] OPTICAL FIBER BUNDLE WITH REINFORCED END PORTIONS

[75] Inventors: Toshio Nakatsubo, Tachikawa; Kaoru Ohyoshi, Hachiouji, both of Japan

[73] Assignee: Olympus Optical Co., Ltd., Japan

[21] Appl. No.: 763,676

[22] Filed: Jan. 28, 1977

Related U.S. Application Data

[63] Continuation of Ser. No. 536,482, Dec. 26, 1974, abandoned.

[30] Foreign Application Priority Data

Dec. 26, 1973 Japan .................................. 48-143910

[51] Int. Cl.$^2$ ............................................. G02B 5/14
[52] U.S. Cl. ................................ 350/96.24; 65/3 C
[58] Field of Search ..................... 350/96 B, 96 BC

[56] References Cited

U.S. PATENT DOCUMENTS

| 3,033,731 | 5/1962 | Cole | 350/96 BC X |
| 3,215,029 | 11/1965 | Woodcock | 350/96 BC |
| 3,383,192 | 5/1968 | Siegmund | 350/96 BC X |
| 3,580,775 | 5/1971 | Siegmund | 350/96 BC X |
| 3,624,816 | 11/1971 | Strack et al. | 350/96 BC |
| 3,830,667 | 8/1974 | Carpenter | 350/96 B X |

*Primary Examiner*—John K. Corbin
*Assistant Examiner*—John D. Lee
*Attorney, Agent, or Firm*—Cushman, Darby & Cushman

[57] ABSTRACT

An optical fiber bundle having end portions where respective fibers are fixed together and a middle portion where respective fibers are separated from each other and provided with reinforcing pipes covering portions near border lines between said middle portion and said end portions, portions near end portions of said optical fiber bundle having high strength against bending.

4 Claims, 9 Drawing Figures

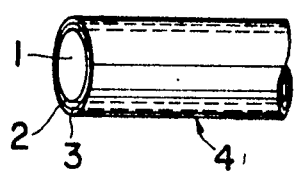
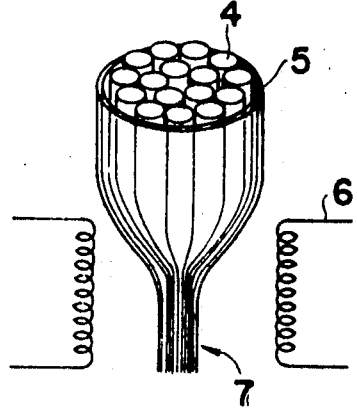
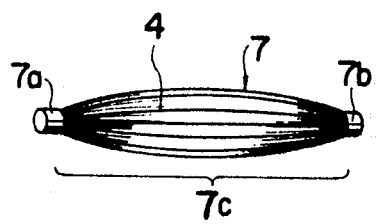
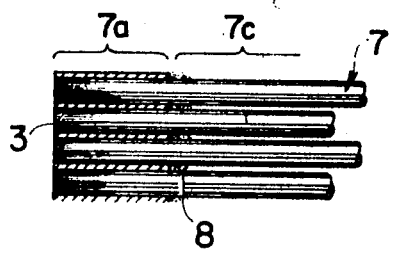
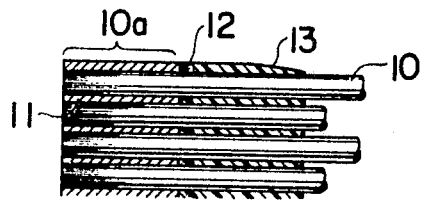
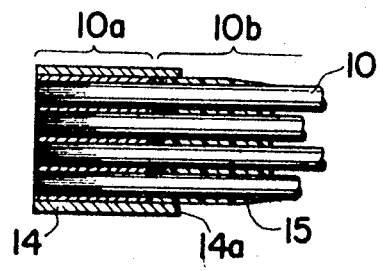

OPTICAL FIBER BUNDLE WITH REINFORCED END PORTIONS

This is a continuation of application Ser. No. 536,482, now abandoned, filed Dec. 26, 1974.

BACKGROUND OF THE INVENTION (a) Field of the Invention

The present invention relates to an optical fiber bundle and, more particularly, to an optical fiber bundle for which respective fibers thereof are firmly fixed together at its end portions and, at the same time, are separated from each other at the middle portion other than end portions so that said optical fiber bundle will have flexibility.

(b) Description of the Prior Art

For an image guide or the like used, for example, for endoscope, it is necessary to fix perspective fibers together, at both end portions of the image fiber, so that respective fibers will be kept in identical geometrical patterns at both end portions in order to transmit the image focused on one end face of the image guide to the opposite end face so that a clear-cut and correct image can be obtained on said opposite end face. Besides, it is necessary to arrange the endoscope so that it can be inserted to any desired portion in order to make it possible to observe any such portion. Therefore, the image fiber to be used for the endoscope should have, as far as possible, high flexibility at its middle portion other than its both end portions. Consequently, for the image fiber, it is so required that respective fibers are kept separated from each other at its middle portion.

To meet the above-mentioned requirement, optical fiber bundles prepared by a method as described below are known. That is, as shown in FIG. 1, an optical fiber 4 is prepared by providing a layer 3 of acid-soluble glass on the outer surface of known optical fiber assembly consisting of a light-conducting core 1 made of glass having a comparatively high refractive index and cladding 2 made of glass having a comparatively low refractive index and provided on the outer surface of the core 1. Many of said optical fibers 4 are bundled together, and that optical fiber bundle is inserted into a cylindrical tube 5 made of acid-soluble glass and is drawn by heating by a heater 6 as shown in FIG. 2. Thus, a rod-type fiber bundle 7 is formed. After covering both end portions of said rod-type fiber bundle 7 with acid-resisting material, the rod-type fiber bundle 7 is immersed in acid in order to dissolve and remove the cylindrical tube 5 of acid-soluble glass and the layer 3 of acid-soluble glass covering the middle portion of each fiber 4 except for those covering both end portions. Thus, respective fibers are separated from each other at the middle portion and a flexible optical fiber bundle is obtained. The optical fiber bundle 7 made by the method as described in the above has, as shown in FIG. 3, both end portions 7a and 7b at which respective fibers 4 are fixed together and the middle portion 7c at which respective fibers are separated from each other. For the most part of the middle portion 7c at which respective fibers 4 are separated from each other, acid-soluble glass layers 3 are dissolved by acid and removed completely. However, at portions adjacent to border lines between the middle portion 7c where respective fibers are separated from each other and both end portions 7a and 7b, sludge 8 of glass which is not completely dissolved by the acid remains unremoved because the acid does not sufficiently permeate into interstices between respective fibers as such portions. (Refer to FIG. 4.) The amount of such sludge 8 becomes larger at portions closer to said border lines. (When glass containing $SiO_2$ is used as said acid-soluble glass, said sludge 8 also contains $SiO_2$, etc. which are comparatively insoluble in acid.) To eliminate such sludge 8 which remains unremoved, it is preferable to make the acid-soluble glass layer 3 provided to each fiber 4 thicker. When, however, the layer 3 is made thicker, the ratio of the portion which is not useful for light conducting becomes larger and, therefore, the light-conducting efficiency decreases. In practice, the layer 3 is therefore made as thin as possible and its thickness is about 1 $\mu$ to 5 $\mu$ in general. Consequently, it is impossible to eliminate the above-mentioned sludge 8 completely.

As described in the above, respective fibers of this kind of optical fiber bundle are fixed together at their both end portions 7a and 7b and cannot be moved at all. On the other hand, at those portions of the middle portion 7c which can close to the above-mentioned border lines, respective fibers can be moved as the acid-soluble glass is partially removed though their movement is somewhat restricted because the above-mentioned sludge 8 exists. Moreover, this kind of optical fiber bundle is frequently bent when using as described already. When the optical fiber bundle is bent, stress is concentratively applied to portions near the above-mentioned border lines between the separated portion 7c and fixed portions 7a and 7b. Consequently, respective optical fibers have a strong tendency to be broken at those portions near the border lines. Even if the stress applied to portions close to said border lines is not so large to cause breakage to fibers, respective fibers are injured, when they are bent, because of the sludge such as acid-soluble glass which was not dissolved completely, $SiO_2$, etc., in case such sludge exists between respective fibers and, therefore, respective fibers become susceptible to breakage. Moreover, if said sludge exists as lumps between respective fibers, the bent fibers are subjected to an extremely large concentrated stress at the position where such lump of sludge exists and, therefore, tend to be broken.

SUMMARY OF THE INVENTION

It is, therefore, a primary object of the present invention to provide an optical fiber bundle having both end portions where respective fibers are fixed together and a middle portion where respective fibers are separated from each other and arranged to have high strength against bending, tension, etc., by filling plastics into interstices between respective fiber at portions close to border lines between said middle portion and both end portions.

Another object of the present invention is to provide an optical fiber bundle having both end portions where respective fibers are fixed together and a middle portion where respective fibers are separated from each other and arranged to have high strength against bending, tension, etc., by covering those portions close to border lines between said middle portion and both end portions by means of reinforcing pipes.

BRIEF DESCRIPTION OF THE DRAWINGS

FIG. 1 shows an enlarged perspective view illustrating a part of an optical fiber;

FIG. 2 shows a perspective view for explaining a process for making an optical fiber bundle;

FIG. 3 shows a perspective view illustrating a known optical fiber bundle as a whole;

FIG. 4 shows an enlarged sectional view illustrating a portion of a known optical fiber bundle; and FIG. 5 through FIG. 9 show enlarged sectional views of respective embodiments of the optical fiber bundle according to the present invention.

DETAILED DESCRIPTION OF THE PREFERRED EMBODIMENTS

Figure 7:
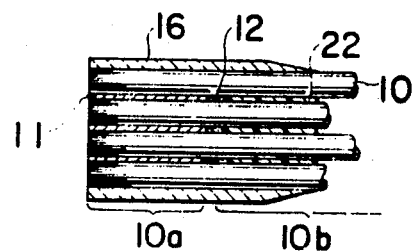

FIG. 5 shows a first embodiment of the optical fiber bundle according to the present invention. In FIG. 5, numeral 10 designates an optical fiber shown in FIG. 1 and consisting of a light-conducting core 1 made of high-refractive index glass and a cladding 2 made of low-refractive index glass and surrounding said core 1. Numral 11 designates an acid-soluble glass layer which corresponds to the layer 3 shown in FIG. 1. A portion designated by a numeral 10a is the portion where respective optical fibers 10 are fixed together. Numeral 12 designates sludge which cannot be completely removed by dissolving by acid. Numeral 13 designates plastic layers having suitable flexibility which are injected into interstices between respective fibers at the portion close to the afore-mentioned border line and cured therein. At the portion getting toward the middle of the optical fiber bundle from portions where said plastic layers 13 exist (i.e., on the right hand in FIG. 5), acid-soluble glass layers are completely removed and, therefore, respective optical fibers are separated from each other.

It is desirable that the plastic, which is used for layers 13 in the optical fiber bundle according to the present invention as described in the above, has adequate hardness and flexibility. Said adequate hardness and flexibility of said plastic is different according to the diameter of the fiber bundle, diameter of respective fibers, thickness of acid-soluble layers, etc. As said plastic, however, it is preferable to use, for example, potting elastomers such as RTV, GEL (brand names), etc. made by Shinetsu Chemical Industry Co., Ltd. for reasons as given below. That is, their viscosity is low, i.e., about 10 poises at 25° C., their hardness after curing is ASTM D 2240, Type A Shore durometer 22 or less, and they have high flexibility. Therefore, they can be easily permeated into interstices between respective fibers when injecting in and, consequently, it is easy to manufacture the optical fiber bundle. Moreover, as they have high flexibility, they are very effective for prevention of breakage of fibers which is an object of the present invention.

When it is possible to make the length from the end face of the flexible optical fiber bundle as described in the above to the bendable portion, at which the optical fiber bundle can be bent, comparatively long, the above-mentioned plastic layers may be provided for a comparatively long range of several millimeters or more. Therefore, in such case, it is very effective if soft material is used for said plastic layers. On the other hand, when it is required to make said length from the end face to the bendable portion very short, it is unavoidable to make the length of plastic layers also short accordingly. In such case, it is not preferable to use soft plastic because stress will be centralized directly at portions close to the aforementioned border lines.

In such case, it is preferable to use, for example, Araldite AY103/HY951, Cemedine 1565/D (brand names) having especially low viscosity out of epoxy resins which are widely used as binding agents, etc. However, these binding agents become considerably hard after curing and, therefore, flexibility becomes sometimes insufficient. (Especially when fibers have large diameter and interstices between respective fibers after dissolving and removing the acid-soluble glass are large, flexibility often becomes insufficient.) In such case, it is necessary to adjust the hardness to the most favourable value by adding PVB (polyvinyl butyral) dissolved in an organic solvent such as xylene, epoxy resin DER (brand name) made by Dow Corning Corp., etc. as a flexibilizer. If, however, too much xylene - PVB solution is added for increasing the flexibility to the large extent, it is not desirable because contraction of volume at the time of curing becomes very large. If it is necessary to add more than 10% of xylene - PVB solution, better results may be obtained when DER is used instead. In these cases, it is possible to select the plastic material, by changing the mixing ratio, from those of the hardness about HRM 100 by Rockwell M scale such as Araldite, Cemedine, etc., to those of the ASTM D 2240, Type A Shore durometer 22 such as DER. Besides, some of polyurethane resins have low viscosity, and good results may be obtained by using such polyurethane resins instead.

As described in the above, it is desirable to select the suitable flexibility of plastic to be filled to an adequate value according to conditions such as the diameter of fibers, and examples of actual materials for selecting the desired flexibility are shown in the above. The ideal way of arrangement is, however, as follows. That is, at the portion close to the border line between the each end portion where fibers are fixed together and middle portion where fibers are separated from each other, i.e., at the portion where sludge exists, it is desirable to use a plastic having comparatively low flexibility, high hardness and large adhesive force. On the other hand, for portions closer to the middle portion where fibers are completely separated from each other, it is desirable to use plastics having higher flexibilities in turn. If it is arranged as mentioned in the above, the filled plastic is hard enough at the border line and, therefore, stress is not concentrated at fibers at the border line portion and the fiber bundle will have extremely high strength against bending, tension, etc.

In practice, however, it is very difficult to give variation to the hardness of plastic as described in the above. On the other hand, it is generally known to add various inorganic materials such as glass fiber to plastics for which hardness is insufficient in order to get reinforced material, for example, fiber-reinforced plastic (FRP). As the sludge existing near the above-mentioned border line serves like the filler for FRP, plastic filled at portions closer to the border line, where sludge exists in comparatively larger amounts, has higher strength and, at portions which are free from sludge, flexibility inherent to the plastic is kept as it is. Therefore, the filled plastic will have hardness distribution close to the ideal hardness distribution mentioned in the above. Consequently, a favorable bending characteristic will be assured.

In the following, a second embodiment of the present invention is described for which strength against still stronger bending and tension is further increased by keeping the sufficient hardness at the above-mentioned border line. Said second embodiment is arranged as shown in FIG. 6, i.e., arranged by protecting the portion near the border line between the end portion 10a and middle portion 10b of the embodiment shown in FIG. 4 by means of a reinforcing pipe 14. That is, for the fiber bundle arranged by the method described already, i.e., the fiber bundle for which respective fibers 10 are fixed together at the end portion 10a and are separated from each other at the middle portion 10b as acid-soluble glass is removed therefrom, the reinforcing pipe 14 is provided and, moreover, plastic 15 is filled into interstices between said reinforcing pipe 14 and respective fibers and between respective fibers by injecting plastic 15 and curing it.

For the optical fiber bundle arranged as above, stress does not concentrate at portions of respective fibers at the aforementioned border line, even when said optical fiber bundle is strongly bent, because the reinforcing pipe 14 exists. Besides, at the portion near the end face 14a of the reinforcing pipe 14, flexible plastic 15 is filled around respective fibers and, therefore, protects respective fibers at that portion. Moreover, as said plastic 15 has flexibility, stress does not concentrate at that position. As the case is as described in the above, it is preferable that the plastic 15 to be filled has high flexibility.

FIG. 7 shows a third embodiment of the present invention. In FIG. 7, numeral 16 designates a reinforcing pipe for which thickness is made smaller toward its end. Therefore, said reinforcing pipe 16 is hard at the portion 10a where respective fibers are fixed together and its flexibility becomes gradually higher toward its end. Therefore, for the optical fiber bundle shown in FIG. 7, the border line portion between the end portion where respective fibers are fixed together and middle portion where respective fibers are separated from each other is covered by the portion of the reinforcing pipe where its thickness is largest, i.e., the hard portion of the reinforcing pipe. Therefore, stress does not concentrate at that border line portion even if the optical fiber bundle is bent strongly. Moreover, as the end portion of the reinforcing pipe is made thinner and is flexible, stress also does not concentrate at that portion of the optical fiber bundle.

Figure 8:
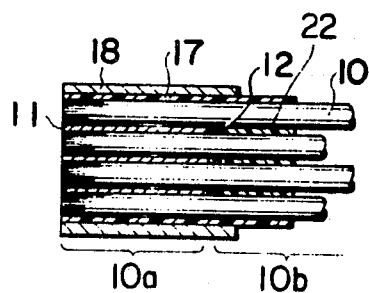

FIG. 8 shows a fourth embodiment of the present invention in which the optical fiber bundle is at first covered by a flexible pipe 17 and, then, further covered by a reinforcing pipe 18 which is not so flexible. In this embodiment, the reinforcing pipe 18 is made shorter than the flexible pipe 17. Therefore, though the reinforcing pipe 18 itself is not arranged so that its flexibility varies as in the case of the third embodiment, the portion of the optical fiber bundle covered only by the flexible pipe 17 has flexibility and the portion where the reinforcing pipe 18 is provided is not flexible. Consequently, flexibility of the optical fiber bundle changes in step and the optical fiber bundle itself functions in the same way as the third embodiment.

Figure 9:
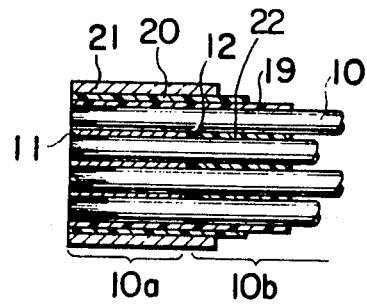

FIG. 9 shows a fifth embodiment of the present invention having reinforcing pipes which are arranged so that flexibility changes in step as in the case of the fourth embodiment and further arranged so that flexibility changes in a larger number of steps. That is, around the optical fibers 10, a flexible protecting pipe 19 is provided at the innermost position, a protecting pipe 20 made of a material having flexibility equivalent to that of the pipe 19 or slightly harder is provided around the protective pipe 19, and a reinforcing pipe 21 made of hard material such as metal is provided at the outermost position, ends of said pipes 19, 20 and 21 on the 10b side of optical fibers 10 being shifted in small steps in turn.

Besides, numeral 22 given to the third through fifth embodiments designates flexible plastic filled into interstices between respective fibers. Though it is all right if either said flexible plastic 22 is used or not, it is more preferable to use said flexible plastic 22.

As described in detail in the above, the optical fiber bundle according to the present invention has various advantages as follows. That is, as respective fibers are firmly fixed together at its end portions and are separated from each other at its middle portion, the optical fiber bundle has extremely high flexibility. Moreover, as reinforcing plastic is filled at border line portions between the flexible middle portion and fixed end portions and reinforcing pipes are further provided, the optical fiber bundle is completely free from danger of breakage of its fibers even when it is bent very strongly. Therefore, the optical fiber bundle according to the present invention is especially effective when it is employed, for example, as an image guide, etc., of endoscopes which is to be used by bending freely.

We claim:

1. An optical fiber bundle with reinforced end portions comprising a fiber bundle having end portions where respective fibers each covered with a layer of acid-soluble glass are fixed together and a middle portion where respective fibers are separated from each other by dissolving said layers of acid-soluble glass by acid, and a plastic material of a type which contracts only a small amount during curing filled into interstices between respective fibers at those portions that are close to border lines between said middle portion of said fiber bundle and each of said end portions and where sludge of said acid-soluble glass exists, the amount of sludge remaining in interstices between optical fibers being larger at the portion closer to each border line and being smaller towards the middle portion, said plastic material also being of a type that remains flexible after curing.

2. An optical fiber bundle with reinforced end portions according to claim 1 in which circumferences of said portions of said fiber bundle close to said border lines are covered by plastics having suitable flexibility.

3. An optical fiber bundle with reinforced end portions according to claim 1 in which said plastics filled into interstices between respective fibers are formed so that hardness of said plastics is the highest at said border line and becomes gradually lower toward said middle portion where respective fibers are separated from each other, said variation in hardness being caused by the amount of sludge existing between the optical fibers being largest at the border line and smaller toward the middle portion.

4. An optical fiber bundle with reinforced end portions according to claim 1 in which said optical fiber bundle further comprises reinforcing pipes covering portions of said fiber bundle close to said border lines.

* * * * *